United States Patent [19]

Lundquist et al.

[11] 3,972,051

[45] July 27, 1976

[54] AIR TURBULENCE CONTROL OF INFLIGHT INK DROPLETS IN NON-IMPACT RECORDERS

[75] Inventors: David E. Lundquist; Arvin D. McGregor, both of Birmingham, Mich.; Paul R. Hoffman, Exton, Pa.

[73] Assignee: Burroughs Corporation, Detroit, Mich.

[22] Filed: Oct. 24, 1975

[21] Appl. No.: 625,811

[52] U.S. Cl. ........................................ 346/1; 346/75

[51] Int. Cl.² ........................................ G01D 15/18

[58] Field of Search ................................ 346/1, 75

[56] References Cited

UNITED STATES PATENTS

| | | | |
|---|---|---|---|
| 3,596,275 | 7/1971 | Sweet | 346/1 |
| 3,681,778 | 8/1972 | Keur | 346/75 |
| 3,936,135 | 2/1976 | Duffield | 346/75 X |

*Primary Examiner*—George H. Miller, Jr.
*Attorney, Agent, or Firm*—Larry Michael Jarvis; William B. Penn; Carl Fissell, Jr.

[57] ABSTRACT

A laminar air flow passageway through which ink droplets are directed before striking a moving print medium, having a portion of the passageway contoured to expand toward the print medium for slowing a column of air passing therethrough before the column reaches the document. Air suction apertures located in the expanded portion of the passageway and near the print medium provide withdrawal of the airflow to prevent air buildup at the document interface and to maintain laminarity as the air slows. A separate embodiment includes a single air suction aperture located in the upper portion of a gently expanding air passsageway for airflow withdrawal.

14 Claims, 6 Drawing Figures

AIR TURBULENCE CONTROL OF INFLIGHT INK DROPLETS IN NON-IMPACT RECORDERS

BACKGROUND OF THE INVENTION

1. Field of the Invention

The invention relates to ink jet printers and recorders, and more particularly to the control of droplet motions and flight paths in ink droplet printers.

2. Description of the Prior Art

In ink jet printers, liquid droplets are projected in a uniformly spaced relationship onto a moving print medium. The droplets are given an electrostatic charge during generation for subsequent electrical deflection by a pair of electrodes for controlling the droplet flight path for proper character printing.

Heretofore, droplet generation frequencies have been increased to such an extent that the effects due to air drag forces on the droplet moving through ambient air have become noticeable. One effect which is prominent in high speed droplet projection is an air retardation effect. This effect occurs because some droplet paths are longer than others during character printing, and therefore a relative time delay will occur by the air retarding those droplets traveling longer distances. During this time delay the document has moved a slight distance making the droplet's impact upon the printing medium fall downstream from its proper print location. Thus, air retardation gives a progressive vertical curvature to each vertical character stroke proportionate with the time delays of individual droplets.

A second effect of air drag is associated with a wake of disturbed air which follows directly behind each droplet. As the droplet's flight speed increases relative to the air, a wake turbulence forms behind each droplet disturbing the immediately following droplet. One effect of a droplet following in the turbulent area of the wake of a preceding droplet manifests itself as a "wandering" of the individual droplet about its proper point of impact on the print medium. A second effect occurs when the trailing droplet experiences less of an air drag force than the leading droplet, whereupon the trailing droplet eventually collides and merges with the leading droplet.

To reduce air disturbance effects on ink droplets, the prior art has suggested the use of a laminar flow of air collinear with the path of droplet flight. See for example U.S. Pat. No. 3,596,275 issued to R. G. Sweet on July 27, 1971. The prior art has used such an air flow with droplet frequencies generally maintained in a 100 kilocycle range with droplet flight velocities of 500–600 inches per second, but lately the frequency range has been extended to the 300 kilocycle range with droplet flight rates of 2000–2200 inches per second. Because air turbulent forces increase geometrically with droplet velocity, the air turbulent forces occurring in the 300 kilocycle range are 6 to 7 times as great as those occurring in the 100 kilocycle range.

At such high flight rates a more rapid column of air is required to be forced along the droplet path in order to eliminate droplet turbulence. But problems arise due to a more rapidly moving air flow. As the air column confronts the moving document air disturbance erupts along the document interface. Such airwave turbulence and other distorting air patterns affect the droplets as they enter the printing interface.

Further, air turbulence may also be generated from the rapidly moving air column setting up wave patterns off the housing or bounding walls where such walls exist enclosing the ink jet printer.

Thus, with an increase in droplet flight velocities the conventional laminar flow of air necessary to abate such air disturbances will only add further turbulent disturbances near the print medium which will affect the droplet flight path. Therefore special apparatus for maintaining and controlling a high speed laminar air flow in ink jet printers has come to be regarded as highly desirable.

It is accordingly an object of the present invention to substantially eliminate air disturbance effects on inflight ink droplets in an ink jet printing device.

It is another object of this invention to maintain a high speed laminar column of air moving collinear with the path of inflight ink droplets in an ink jet printing device.

It is a further object of this invention to remove air disturbance effects on inflight ink droplets at the printing interface where a laminar column of air confronts the print medium.

SUMMARY OF THE INVENTION

The objects and purposes of the invention are achieved by an ink jet printer having a droplet flight passageway designed to provide a laminar flow of air therethrough for decreasing the relative air velocity of ink droplets as they are directed through the passageway and onto a print medium. The flow of air is slowed within the passageway before confronting the print medium and a sufficient quantity of air is withdrawn from the region where the air column loses its velocity to maintain air laminarity as the air flow slows. A larger quantity of air is withdrawn to prevent air buildup or other air disturbances near the print medium as the air column confronts the medium.

Other objects, features and advantages of the present invention will be readily apparent from the following description of the preferred embodiments taken in conjunction with the appended claims and accompanying drawings.

DESCRIPTION OF THE PREFERRED EMBODIMENT

Figure 1:
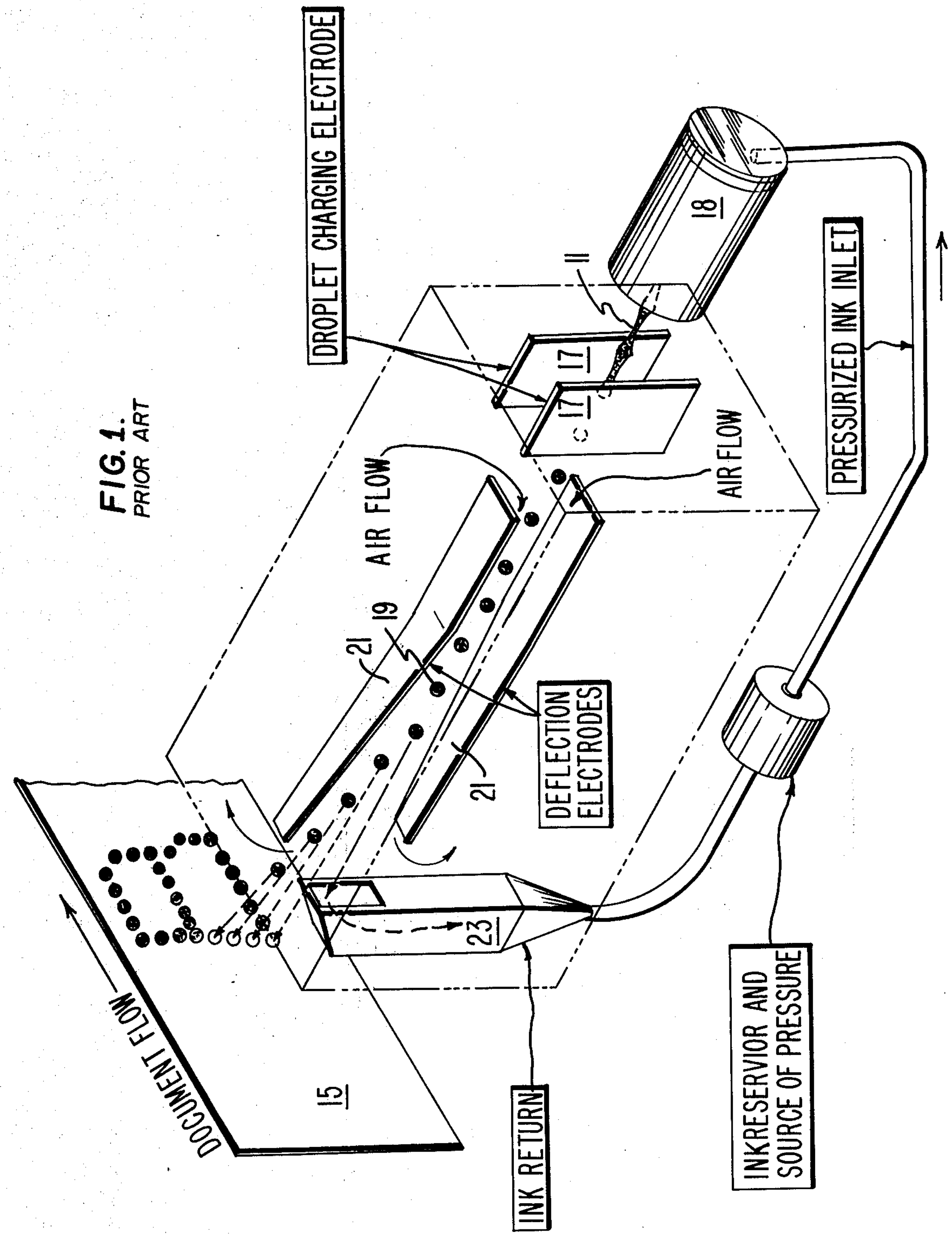
FIG. 1. PRIOR ART
FIG. 1 is an overall perspective view of the basic elemental arrangement of an ink jet printer that incorporates the present invention.

FIG. 1 illustrates the basic elemental arrangement of an ink jet printer of the type requiring air turbulence control of inflight ink droplets, such elemental arrangement being described in detail relative to a 300 kilocycle range ink jet printer in U.S. Ser. No. 577,667 filed May 15, 1975 and assigned to the assignee of the present application. In ink printers of the referenced type ink droplets 19 are directed from an ink droplet generator 18 onto a moving print document 15. The droplet generator ejects a perturbed ink stream 11 which separates into a plurality of droplets 19 while passing through a charging electrode 17. The charging electrode 17 may fully or partially surround the jet droplet stream at the point of its separation into individual droplets for applying an electrical charge to the droplets as a function of the voltage present upon the charging electrode as droplet separation occurs.

A pair of deflecting electrodes designated 21 in the drawings are positioned downstream from the charging electrode 17 for deflecting the charged droplets out of their straight line path of movement into a proper printing path determined by electrical information transmitted to the charging electrode 17. The extent of droplet deflection is determined by the magnitude of the charge on the droplets and the voltage that is maintained on the deflecting electrodes 21.

Figure 2:
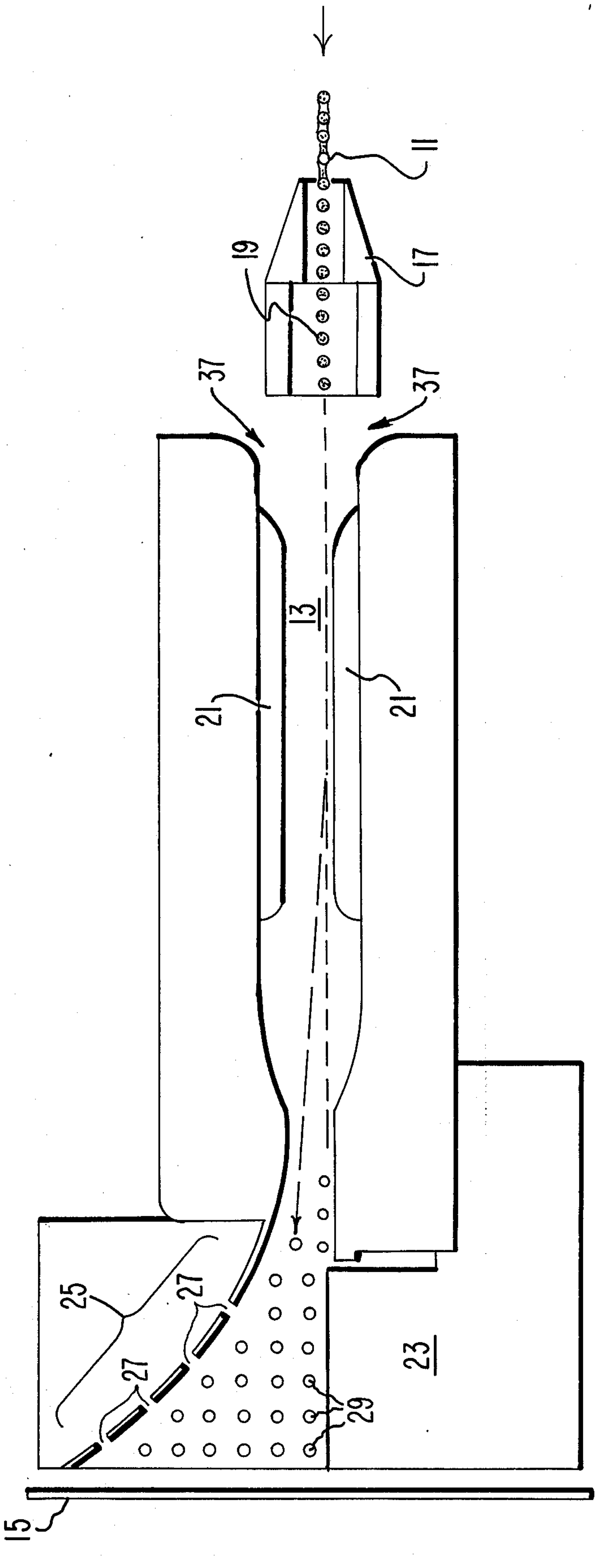
FIG. 2 shows a partial, cross sectional side view, more in detail, of one embodiment of air turbulence control apparatus disposed along the passageway of an ink jet printer.

FIG. 2 illustrates one embodiment of the present invention wherein air turbulence control apparatus is provided for use with a 300 kilocycle range droplet generator that produces a droplet flight rate of approximately 2000 inches per second. In this embodiment the deflecting electrodes 21 are comprised of a pair of flat parallel plates set in an opposed relationship about the droplet pathway, the plates being supported within a passageway 13 in any convenient manner such that the droplet flight path is unobstructed. The passageway 13 is formed from an electrical insulating material to prevent electrical interference with the deflecting electrodes 21.

Droplets not to be printed are not affected by the charging electrode 17 and accordingly experience no deflection from the deflecting electrodes 21. They therefore follow a straight line path into a droplet catcher 23. The ink from the droplet catcher 23 is recirculated back to the ink droplet generator for further use as illustrated in FIG. 1.

The walls of the passageway 13 are shaped to maintain a laminar flow of air passing therethrough. The air flow originates closely downstream of the charging electrode 17, as indicated in FIG. 2 by the numeral 37, and passes over the deflecting electrodes 21 moving down the passageway in a relatively straight-line direction substantially orthogonal to the print medium 15. The laminar flow of air is used to reduce the relative velocity of the droplets with respect to the surrounding air in order to eliminate air retardation effects and droplet wake effects. The rate of air flow within the passageway, corresponding to the above-mentioned droplet flight rate characteristic of 2000 inches per second, is designed to provide an approximate mean air velocity of 930 inches per second and a range of from 800–1100 inches per second. The range of permissible mean air velocities of the laminar air flow for a given droplet will vary with the size and speed of the droplet in flight as is known by those skilled in the art of droplet aerodynamics. It is to be noted in this connection that the ink droplet generator described in the above referenced U.S. patent application produces droplets having a mass of $0.50 \times 10^{-6}$ grams and a diameter of $3.7 \times 10^{-3}$ inches.

The laminar flow of air within the passageway must be predicted exactly in an orderly and repeatable fashion in order to control the printing of droplets in a predictable manner. Thus, the inside walls of the passageway are shaped such that the product of the air velocity traveling down the passageway times the minimum lateral dimension of the passageway times the air density, divided by the air viscosity yields a constant, *R*, less than 2300. *R*, therefore, may be expressed according to the formula:

$$R = VMP/U < 2300$$

where $V$ = velocity of the air
$M$ = minimum lateral air passage dimension
$P$ = air density
$U$ = air viscosity.

Regardless of the shape or smoothness of the inner surfaces of the passageway, if *R* is maintained less than 2300 the flow of air through the passage will be laminar. However, design values of *R* up to 5000–6000 can be obtained and still maintain smooth laminar flow if reasonable care is taken to provide rounded corners and tapering cross sections of the passageway rather than abruptly changing cross sections in the direction of air flow. Straightening fins or other means may also be provided within the passageway to smooth the incoming air flow.

The passageway 13 is preferably provided with a rectangular cross section smoothly tapering in the direction of air flow and reaching a minimum lateral dimension of 0.200 inches and a minimum height of 0.050 inches. Such a height provides an appropriate value of *R* to permit a laminar flow of air through the passageway at the aforesaid rate of 930 inches per second.

The passageway 13 of the embodiment of FIG. 2 has integrally formed thereto an expansion section 25 to extend the passageway to the print medium 15. The expansion section 25 serves to decrease the velocity of the air as the air column approaches the medium by providing a progressively greater cross sectional area of air flow passageway in the direction of air flow. The expansion section 25 is preferably rectangular in cross section having its width maintained constant while the height of the section is progressively increased in a cosine hyperbolic fashion. The height of the ceiling of the section 25 may be progressively increased in a fashion other than cosine hyperbolic, for example, parabolic, straight line, etc., to provide a progressively greater cross sectional area in the direction of air flow for slowing the same. The length of the expansion section taken along the path of air flow is approximately 0.3 inches.

As the air flow slows within the expansion section 25, the tendency for the flow is to lose its laminarity. Therefore, to maintain a laminar flow of air as the column slows, small air suction holes or apertures 27 are positioned in the ceiling of the expansion section for withdrawing a sufficient quantity of air to maintain air laminarity. The holes approximate 1/16 inches in diameter and are equally dispersed in the ceiling of the expansion section in a matrix fashion with ¼ inches set between the holes to provide an effective withdrawal of air to maintain air laminarity within the expansion section. The holes are circular in shape but may take other forms, for example, narrow, suction slits oriented at right angles to the flow of air along the ceiling of the expansion section. The apertures 27 must be sized to promote adequate air suction therethrough to maintain air laminarity and are positioned where the air column begins to lose its velocity and continue in arrangement to the document.

A second group of holes or apertures 29 are located on both side walls of the expansion chamber 25 and serve as ducts to extract air from the passageway before the flow reaches the document to prevent air buildup and wave interference patterns along the document interface. The holes 29 are circular in shape with an approximate diameter of 1/16 inches and are arrayed in a matrix configuration with ¼ inches set between the holes. The matrix array of holes 29 on each side wall are positioned in mirror-like respect to the relative droplet flight pathway. The holes 29 may be replaced by a single vertical slit spaced closely to the document 15 on both side walls of the chamber 25. Such air extraction through the holes 29 eliminates air buildup at the document interface making the air flow through the passageway smooth. The quantity of air suction through the apertures 27 and 29 is set at approximately 12.9 cubic inches per second.

The air suction holes 27 in the expansion section 25 do not extract a large fraction of the air flow but only serve to maintain the laminarity of the flow within the expansion section 25. The holes 29 on the other hand extract a larger quantity of air to provide smooth flow of air through the passageway and out of the holes 29. The amount of air flow, if any, that continues to the document must be of such a degree as to have negligible effects in the form of air wave disturbance at the print interface. As the droplet approaches the document the relative velocity of the droplet with respect to the air flow begins to increase, although the effect of such air retardation is rendered negligible by the short remaining flight path to the document.

A second embodiment of the present invention is illustrated in FIGS. 3, 4, 5 and 6, wherein elements corresponding to those of FIG. 2 are identified by the same reference numerals and no detailed description thereon will be repeated. In this second embodiment the small air suction holes 27 and 29 of FIG. 2 have been replaced by a single air withdrawal aperture 35 located in an insulating wedge 36 forming the ceiling of the passageway 13 adjacent the document 15. The passageway 13 of this embodiment is H-shaped in the area adjacent the charging electrode 17 and rectangularly shaped in the area adjacent the document 15, the length of the passageway 13 being 2.57 inches. The H-shaped section of the passageway adjacent the charging electrode 17 is provided with an area of 0.035 square inches having a width of 0.220 inches and a mean height of 0.050 inches, and the rectangularly shaped section adjacent the document interface is provided with an area of 0.030 square inches having a width of 0.120 inches and a mean height of 0.250 inches. The air withdrawal aperture 35 is preferably semi-circular in configuration having a width of 0.060 inches, a circumference of 0.472 inches, and an area of 0.0283 square inches.

The single aperture 35 permits withdrawal of the air flow necessary to eliminate air disturbance as the droplet travels from the generator to the document interface. The quantity of air withdrawn through the aperture 35 is approximately 27.2 cubic inches per second.

As shown in FIGS. 3–6, the second embodiment of the invention also provides a gap 39 that separates the insulating wedge 36 and the upper deflecting electrode 21, such gap serving to provide extra electrical insulation to prevent high voltage breakdown between the upper deflecting electrode 21 and the wedge 36. It is to be understood, however, that no suction is provided through the gap 39, and that such gap is not considered to form a part of the inventive air turbulence control apparatus.

Figure 4:
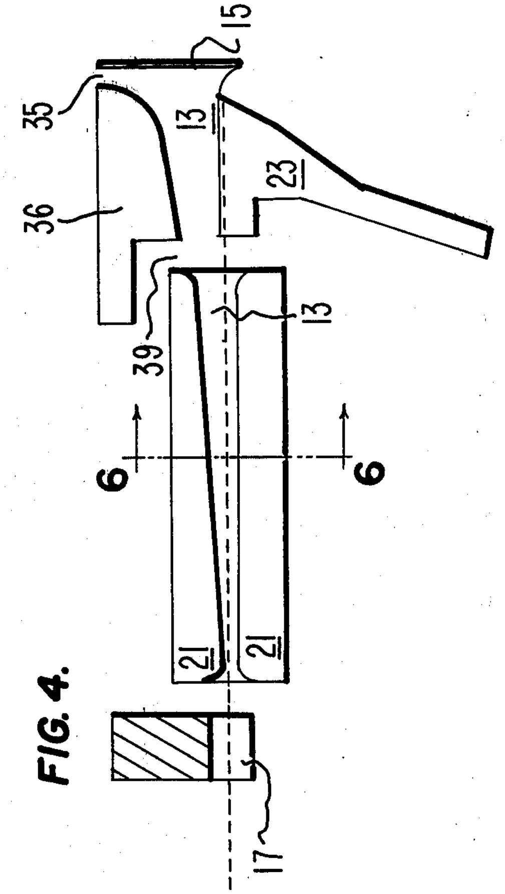
FIG. 4 shows a cross sectional side view of the embodiment of FIG. 3.
Figure 6:
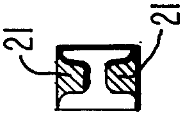
FIG. 6 shows a cross sectional view taken along the line 6—6 of FIG. 4.
Figure 3:
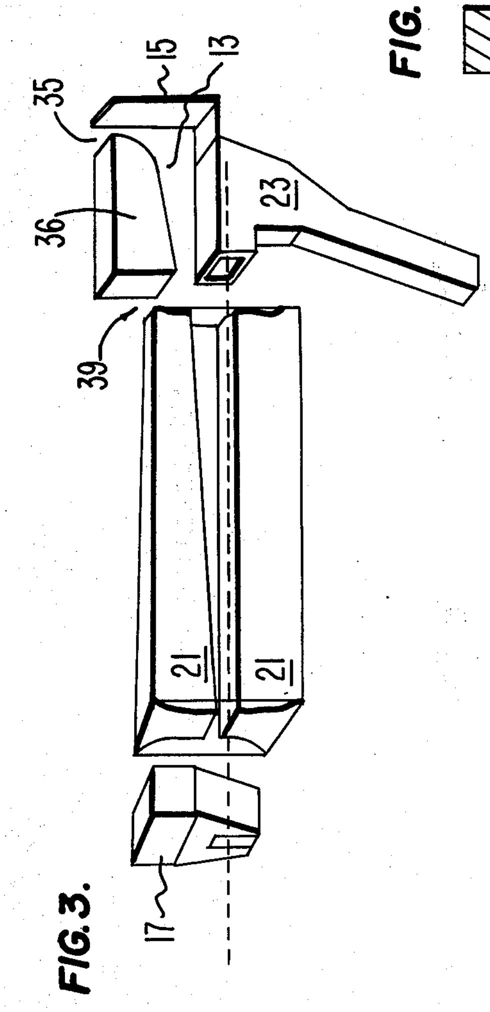
FIG. 3 shows a perspective view of a second embodiment of air turbulence control apparatus for use in an ink jet printer.
Figure 5:
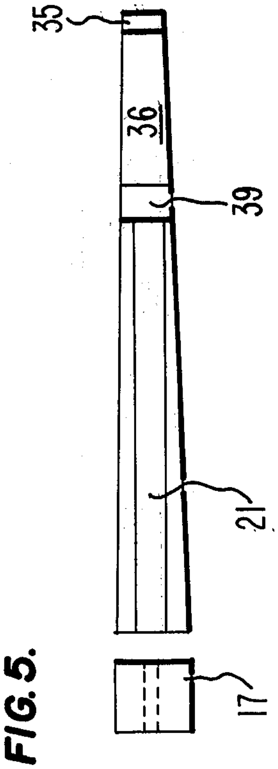
FIG. 5 shows a top view of the embodiment of FIGS. 3 and 4.

In both the FIG. 2 and FIGS. 3 and 4 embodiments of the invention, a minimal suction is maintained in the droplet catcher 23, to prevent ink from being drawn upward away from the catcher and into the suction holes 27–29 or 35. In both embodiments, also, the laminar flow of air within the passageway 13 is effected by applying a vacuum source to the extraction apertures, as for example to the apertures 27 and 29 of the FIG. 2 embodiment and to the aperture 35 of the FIGS. 3–6 embodiment.

It should be understood, of course, that the foregoing disclosure relates to preferred embodiments of the invention and that other modifications or alterations may be made therein without departing from the spirit or scope of the invention as set forth in the appended claims.

What is claimed is:

1. In an ink jet printer for directing ink droplets onto a moving print medium, including a laminar flow of air moving collinear with the path of droplet travel, air turbulence control apparatus comprising:

first and second passageway means through which ink droplets are directed onto a moving print medium, said first passageway means being contoured to maintain a laminar flow of air collinear with respect to droplet travel relative to the print medium;

air flow retarding means associated with said second passageway means and operative in the proximity of the print medium for slowing the flow of air before reaching the medium; and air suction means associated with said second passageway means for withdrawing air from the airflow in the region where the air flow loses its velocity for maintaining the laminarity of the air flow, and for withdrawing air from the proximity of the print medium for preventing air disturbance caused by the air flow confronting the print medium.

2. The apparatus of claim 1 wherein said first passageway means is contoured such that:

$$VMP/U < 2300$$

where $V$ = velocity of the air flow, $M$ = minimum lateral air passage dimension, $P$ = air density, and $U$ = air viscosity.

3. The apparatus of claim 1 further including droplet catcher means for receiving ink droplets not directed to the print medium, and separate air suction means for maintaining air suction in said droplet catcher means sufficient to prevent droplets directed thereto from being misdirected away by air flow movement within said second passageway means.

4. The apparatus of claim 1 wherein said first passageway means has a smooth tapering cross section and is contoured such that:

$$VMP/U < 6000$$

where $V$ = velocity of the air flow, $M$ = minimum lateral air passage dimension,
$P$ = air density, and
$U$ = air viscosity.

5. The apparatus of claim 4 further including means for smoothing the flow of air within said first passageway means, for maintaining the laminar flow of air therein.

6. The apparatus of claim 1 wherein said air flow retarding means operates to provide a progressively greater cross sectional expansion area of the air flow for slowing the same.

7. The apparatus of claim 6 wherein said progressively greater cross sectional expansion area has one dimension of the two describing the cross sectional area of the flow, expanding in a cosine hyperbolic fashion.

8. The apparatus of claim 6 wherein said air flow retarding means comprises said second passageway means extending said first passageway means to the print medium.

9. The apparatus of claim 8 comprising aperture means located in said second passageway means, and wherein said air suction means withdraws air from said second passageway means through said aperture means.

10. In an ink jet printer wherein ink droplets are directed onto a moving print medium, including a laminar flow of air moving collinear with the path of droplet travel, air turbulence control apparatus comprising:

passageway means through which ink droplets are directed onto a moving print medium, said passageway means contoured to maintain a laminar flow of air collinear with respect to droplet travel; and first air suction means for withdrawing air from the air flow within said passageway means at a point contiguous to said print medium for preventing air disturbance caused by the air flow confronting the print medium.

11. The apparatus of claim 10 wherein said first air suction means serves to withdraw air from a single aperture formed in said passageway means contiguous to said print medium.

12. The apparatus of claim 10 further including droplet catcher means for receiving ink droplets not directed to the print medium, and second air suction means for maintaining air suction in said droplet catcher means sufficient to prevent droplets directed thereto from being misdirected away by said first air suction means.

13. A method of eliminating air disturbance effects on ink droplets which are directed onto a moving print medium in an ink jet printer, comprising the steps of:

passing a laminar flow of air collinear with droplet travel relative to the print medium of sufficient velocity to reduce relative air velocity of the droplets;

slowing the laminar flow of air in the proximity of the print medium;

turning the laminar flow of air away from the print medium in the region where the air flow slows; and maintaining air laminarity of the flow in the region where the air flow changes its velocity.

14. The method as recited in claim 13 including the step of withdrawing the air from the air flow orthogonal thereto to turn the laminar flow away from the print medium.

* * * * *